Oct. 31, 1961 F. B. LEMI 3,006,588
FISHING ROD HOLDER
Filed Nov. 14, 1960 2 Sheets-Sheet 1
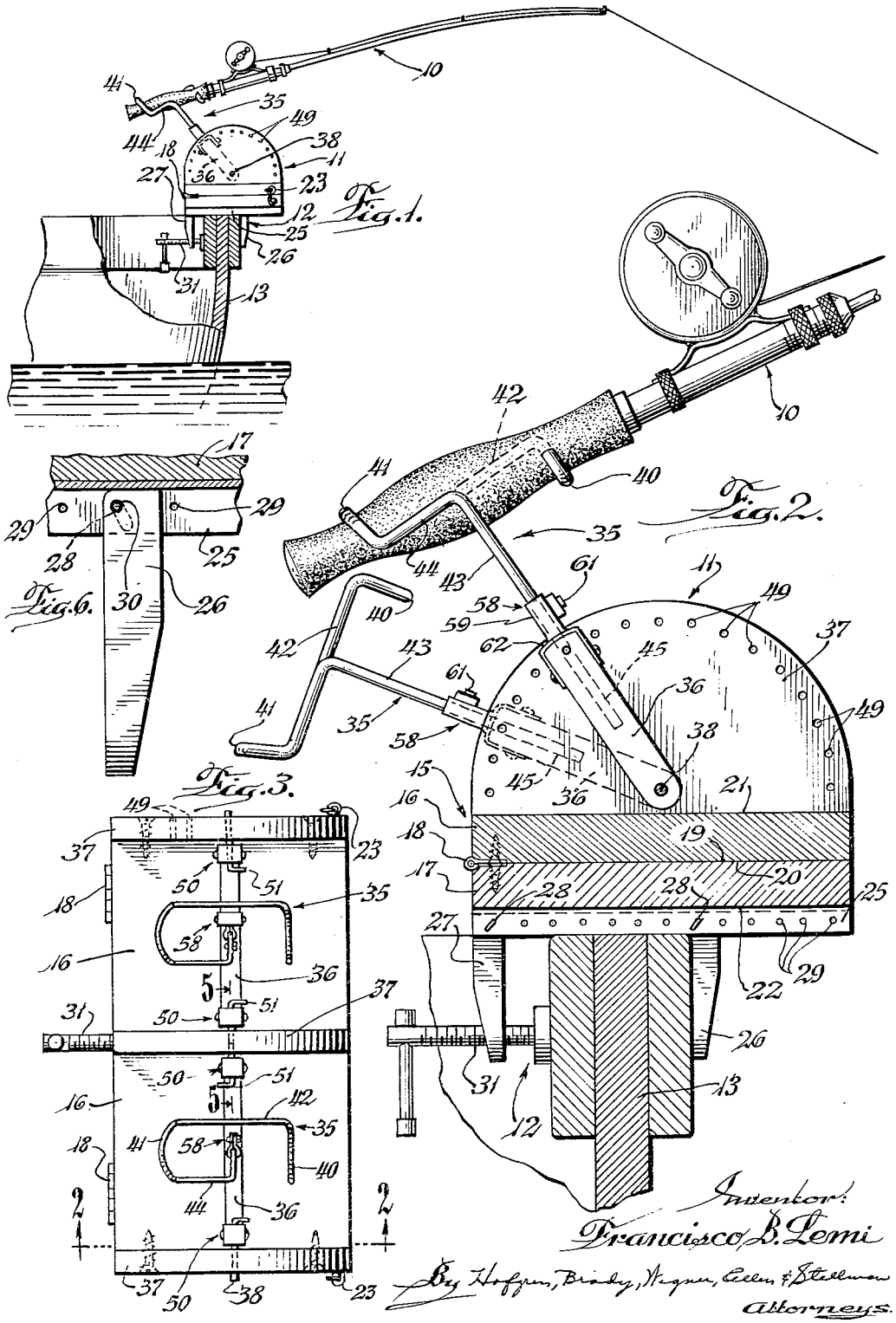
Inventor
Francisco B. Lemi
By Hofgren, Brady, Wegner, Allen & Stellman
Attorneys Oct. 31, 1961 F. B. LEMI 3,006,588
FISHING ROD HOLDER
Filed Nov. 14, 1960 2 Sheets-Sheet 2
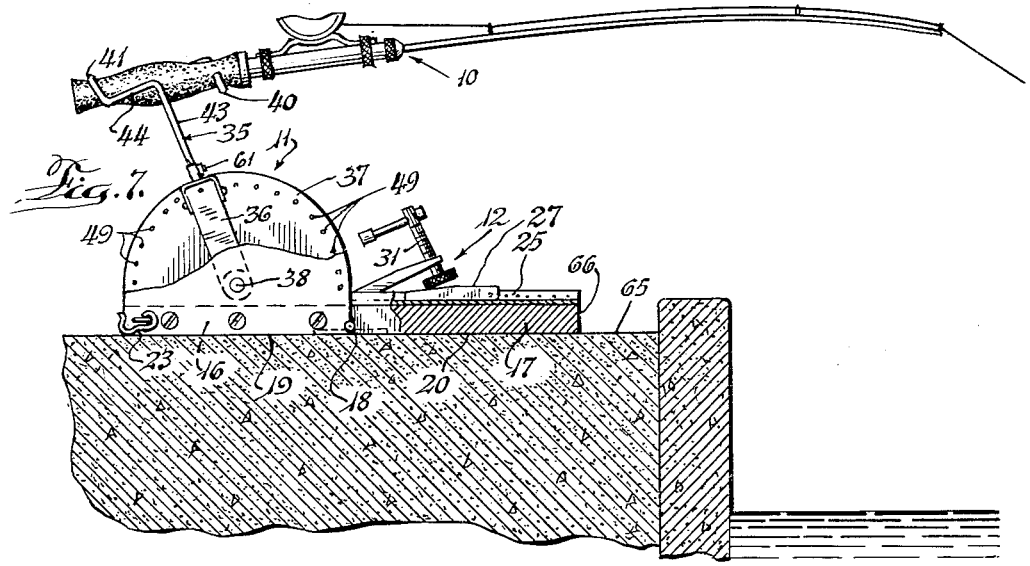
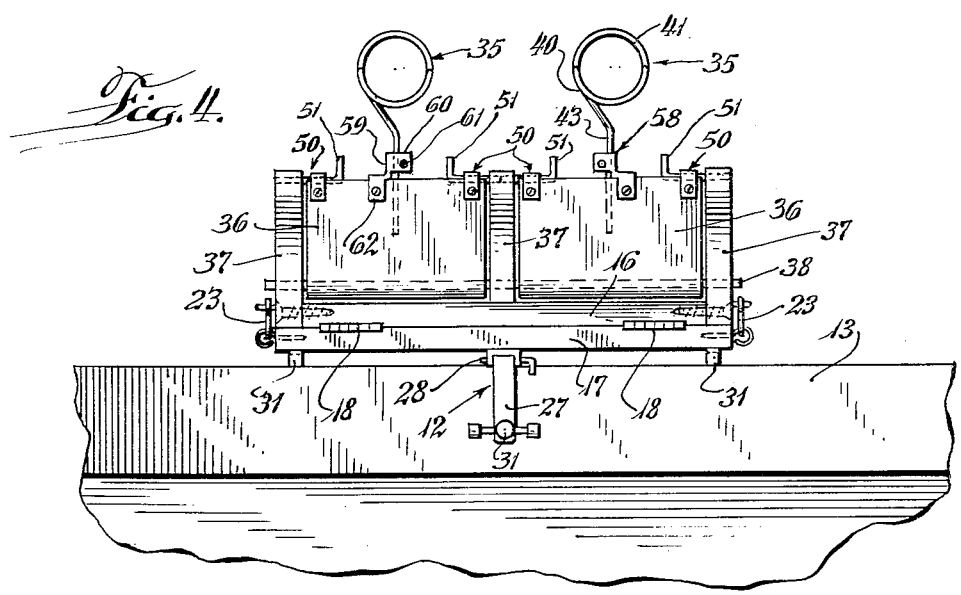
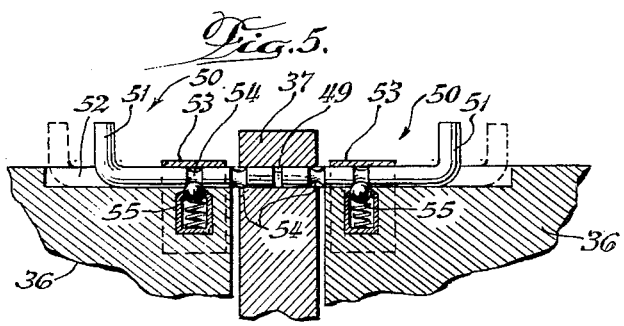

3,006,588
FISHING ROD HOLDER
Francisco B. Lemi, 454 W. 26th St., Chicago 16, Ill.
Filed Nov. 14, 1960, Ser. No. 68,949
11 Claims. (Cl. 248—39)

This invention relates to a support, and more particularly to a rod holder for one or more fishing rods.

A primary object of this invention is the provision of a rod holder which may be attached to a suitable support or operatively rested on a surface, and in which a rod may be conveniently angularly positioned.

Another object of this invention is the provision of a support which may be clamped to a suitable member, or operatively positioned on a generally horizontal surface.

A further object of this invention is the provision of a rod holder in which the rod may be conveniently angularly adjusted both horizontally and vertically.

A feature of the invention is the provision in a rod holder of a base having a stationary member and a movable member secured to each other for relative rotation from a compact position to an extended position, the members being in face-to-face relationship in the compact position and in coplanar relationship in the extended position, with a rod holding bracket secured to the stationary member. A related feature is the provision of an adjustable clamp which may be selectively positioned on the movable member for attaching the holder to a support.

Another feature of the invention is the provision of a rod holder including a base having a stationary member and a movable member each with a first side and an opposite second side, the members being secured to each other for rotation from a compact position, in which the first sides are in face-to-face relationship, to an extended position, in which the first sides are in coplanar relationship for engaging a supporting surface, and with a clamp secured to the second side of the movable member for attaching the rod holder to a support when the base is in the compact position; at least three spaced apart ears secured to the second side of the stationary member with standards mounted between the ears by a rod extending through the ears and standards for rotation of the standards about an axis parallel to the axis of rotation of the stationary and movable member, and a rod holding bracket mounted on each standard for rotation about an axis transverse to the axis of rotation of the stationary and moveable members, and means for maintaining the standards and brackets in rotatably adjusted position.

Further features and advantages of the invention will be readily apparent from the following specification and from the drawings, in which:

FIGURE 1 is a side view of the fishing rod holder in the compact position, and clamped to the transom of a boat, with parts of the boat broken away to more clearly illustrate the construction;

FIGURE 2 is an enlarged sectional side view taken on the line 2—2 in FIGURE 3;

FIGURE 3 is a top view of the fishing rod holder;

FIGURE 4 is a rear view of the fishing rod holder;

FIGURE 5 is a sectional view taken on the line 5—5 in FIGURE 3;

FIGURE 6 is a side view of a portion of a clamp, with parts broken away to more clearly illustrate the construction; and, FIGURE 7 is a side view of the fishing rod holder in the extended position and resting on a supporting surface.

The invention is directed, in brief, to a fishing rod holder in which one or more fishing rods may be supported in fishing rod holding brackets. Each bracket is rotatably mounted on a standard which is rotatably mounted between ears secured to a base, for adjustable angular positioning the fishing rod both horizontally and vertically. The base includes a stationary member to which the ears are attached, and a movable member hinged to the stationary member for rotation from a compact position to an extended position. In the compact position the stationary and movable members are in face-to-face relationship for convenient carrying, and for attaching the holder to a support with a special clamp which is adjustably secured to the movable member. In the extended position, the stationary and movable members are in coplanar relationship for resting on a suitable supporting surface.

Referring to the drawings, FIGURE 1 illustrates a fishing rod 10 supported in the fishing rod holder 11. The holder 11 is in the compact position, and has a clamp 12 attaching it to a suitable support, such as the transom of a boat 13. Referring to FIGURE 2, the fishing rod holder 11 comprises a base 15 having a pair of hinged members including a stationary member 16 and a movable member 17 secured together by hinges 18 providing means for rotating the movable member 17 from the compact position, illustrated in FIGURE 2, to the extended position, illustrated in FIGURE 7. Both of the hinged members 16 and 17 are preferably flat plates with first sides 19 and 20, respectively, and opposite second sides 21 and 22, respectively. In the compact position the hinged members and their first sides 19 and 20 are in fact-to-face relationship, and in the extended position they are in coplanar relationship, with the adjacent edges of the members abutting each other. A cooperating hook and eye 23 on the side edges of the stationary member 16 and the movable member 17, respectively, provide means for locking the hinged members in the compact position.

The clamp 12 provides a means for attaching the fishing rod holder to a support when the base 15 is in the compact position, and is secured to the second side 22 of the movable member 17. The clamp comprises a body member, in the form of an inverted channel member 25, which is centrally positioned and secured on the second side 22 of the movable member 17 and extends transversely to the rotational axis of the hinged members 16 and 17. A pair of clamp legs 26 and 27 are each detachably secured between opposite side walls of the channel member 25 by an L-shaped pin 28 extending through any of a plurality of spaced pairs of opposed holes 29 in the side walls and an aperture 30 in the end of the leg. The clamp legs 26 and 27 may be positioned at any desired location along the channel 25 and by varying the distance between the legs 26 and 27 the clamp may be positioned on supports varying widely in width, and then tightly secured to the support by clamping screw 31 on leg 27. By varying the position of the legs on the channel member 25, the fishing rod holder 11 may be located in any desired position with respect to the support, for example, the holder may be positioned on the transom of boat 13 with a minimum of overhang by attaching the leg 26 to the extreme right-hand pair of holes 29, as viewed in FIGURE 2. Blocks 31, which are of the same depth as the channel member 25, are attached adjacent the side edges of the movable member 17 to provide a level base for engaging the support.

The fishing rod holder 11 has a pair of fishing rod holding brackets 35, each rotatably mounted on a standard 36 which is in turn rotatably mounted between spaced apart ears 37 secured to the second side 21 of the stationary member 16.

Each standard 36 is received in the space between adjacent ears 37 and is mounted on the ears for rotation about an axis parallel to the axis of rotation of the hinged members 16 ad 17 by means comprising a rod 38 extending through aligned apertures in the ears 37 and the standards 36.

Each fishing rod holding bracket 35 is preferably made of rigid wire or a metal rod which is formed at one end with an upright U-shaped portion 40 spaced from an inverted U-shaped portion 41 by an arm 42, with a mounting stem 43 joined to the inverted U-shaped portion 41 by an arm 44. The end of the handle of a fishing rod is received in the inverted U-shaped portion 41, and an inner portion of the fishing rod handle is received in the upright U-shaped portion 40. The fishing rod 10 may be removed from the bracket by merely rotating the tip end of the rod upwardly, thereby preventing slack in the fishing line, in keeping with accepted fishing technique. The bracket mounting stem 43 is received in a deep socket 45 in the standard 36, providing means mounting the bracket on the standard for rotation of the bracket about an axis transverse to the axis of rotation of the hinged members 16 and 17. Thus, the position of the fishing rods may be independently angularly adjusted both horizontally and vertically.

Means comprising latches 50 are provided for maintaining the standard 36 selectively angularly positioned between the ears 37. The ears are provided with a plurality of aligned circumferentially spaced holes 49 for receiving L-shaped pins 51. The pins are slidably mounted in grooves 52 in either side of the top edge of the standards 36, and are retained in the grooves by overlying U-shaped straps 53 each secured to opposite faces of the standard 36 by screws. Each pin has two transverse grooves 54 for receiving a spring pressed ball latch 55 mounted in a socket in the standard 36, for retaining the pin in or out of engagement with the holes 50.

Rotation of the fishing rod holding brackets 35 in the sockets 45 of standards 36 is retarded or prevented by means comprising a friction brake 58 in the form of a metal split collar 59 having ears 60. The ears 60 have aligned apertures received adjustable clamping means in the form of a bolt and nut 61. The collar 59 has an integrally formed U-shaped strap 62 which is secured to opposite faces of the standard 36 by screws. The nut and bolt 61 may be tightened to prevent rotation of the bracket 35 and may be loosened slightly to provide a tight sliding fit between the stem 43 and the collar 59, for retarding rotational movement of the fishing rod holding bracket.

Referring to FIGURE 7, the fishing rod holder 11 may be supported on a suitable horizontal surface, such as a wharf deck 65, by disengaging the hooks and eyes 23 and rotating the hinged members 16 and 17 from the compact position to the extended position. In the extended position the stationary member 16 and the movable member 17, and their respective first faces 19 and 20, are in coplanar alignment. With the tips of the fishing rods positioned in the brackets 35 to extend outwardly past the forward edge 66 of the movable member 16, a long moment arm is provided from the forward edge 66 to the fishing rod holding brackets 35, retarding any tendency of the fishing rod holder 11 to tip about the forward edge 66.

The hinged members 16 and 17, standards 36, and ears 37 may be of any suitable material such as metal, but because of the previously described construction, wood or plastic materials are satisfactory. For example, the standards 36 are rotatably mounted on the ears 37 by the rod 38 which extends through the ears and the standards in such a manner that a long bearing surface is provided in the standards, and the standards are supported on the ears at both ends, which along with the standards locking pins 51 which are seated in holes 49 in the ears 37, twisting of the standards, and possible splitting or cracking of the standards and the ears, is retarded. The latches 50 and friction brake 58 are so constructed that wear and damage to the ears and standards are minimized. Similarly, the bracket stem 43 is received in the deep socket 45 in the standard 46 to minimize the possibility of breakage. In keeping with the foregoing construction, by making the hinged members 16 and 17, the standards 36 and the ears 37 of wood, a buoyant fishing rod holder may be provided.

Although this invention has been illustrated and described with particular reference to a fishing rod holder, it is equally applicable for holding other types of rods, such as a flag staff, or the like.

While I have shown and described certain embodiments of my invention, It is to be understood that it is capable of many modifications. Changes, therefore, in the construction and arrangement may be made without departing from the spirit and scope of the invention as defined in the appended claims.

I claim:

1. A rod holder, comprising: a base having a stationary member and a movable member, means securing said members to each other for relative rotation from a compact position to an extended position, said members being in face-to-face relationship when in said compact position and in coplanar relationship together defining a generally planar supporting base for engaging a supporting surface and operatively positioning the holder when in said extend position; means secured to said movable member for attaching said holder to a support when said base is in the compact position; and at least one rod holding bracket secured to said stationary member.

2. The rod holder of claim 1, and means for locking said members in the compact position.

3. A rod holder, comprising: a base having a stationary member and movable member, means securing said members to each other for relative rotation about an axis from a compact position to an extended position, said members being in face-to-face relationship in said compact position and in coplanar relationship for engaging a supporting surface in said extended position; means secured to said movable member for attaching said rod holder to a support when said base is in said compact position; a standard rotatably mounted on said stationary member for rotation about an axis parallel to the first said axis; and a rod holding bracket rotatably mounted on said standard for rotation about an axis transverse to the first said axis.

4. The rod holder of claim 3 wherein said attaching means comprises: a clamp, said clamp having a pair of legs; a clamping screw on one of said legs; and means for attaching said legs to said movable member and for selectively positioning said legs in a direction transverse to the first said axis.

5. A rod holder, comprising: a base having a stationary member and a movable member secured to each other for relative rotation about an axis from a compact position to an extended position, said members being in face-to-face relationship in said compact position and in coplanar relationship in said extended position; a pair of ears spaced apart in a direction parallel to said axis and secured to said stationary member; a standard between said ears; means mounting said standard on said ears for rotation about an axis parallel to the first said axis; a rod holding bracket; and means mounting said bracket on said standard for rotation about an axis transverse to the first said axis.

6. The rod holder of claim 5, and means for locking said standard in various rotatably adjusted positions.

7. The rod holder of claim 5, and means for adjustably retarding rotation of said bracket.

8. A rod holder, comprising: a base having a stationary member and a movable member, each member having a first side and an opposite second side, means securing said members to each other for relative rotation about an axis from a compact position to an extended position, said first sides being in face-to-face relationship in said compact position in coplanar relationship in said extended position; at least three aligned ears spaced apart in a direction parallel to said axis and secured to the second side of said stationary member; a standard in each space between adjacent ears; means comprising a rod extended through said ears and said standards and mounting said standards on said ears for rotation about an axis parallel to the first said axis; and a rod holding bracket mounted on each of said standards.

9. A rod holder, comprising: a base having a stationary member and a movable member, each member having a first side and an opposite second side, means securing said members to each other for relative rotation about an axis from a compact position to an extended position, said first sides being in face-to-face relationship in said compact position and in coplanar relationship for engaging a supporting surface in said extended position; means secured to said second side of said movable member for attaching said holder to a support when said base is in the compact position; three ears spaced apart in a direction parallel to said axis and secured to the second side of said stationary member; a standard in each space between adjacent ears; means comprising a rod extending through said ears and said standards and mounting said standards on said ears for rotation about an axis parallel to the first said axis; means for individually locking said standards in various rotatably adjusted positions; a rod holding bracket for each of said standards; means mounting said brackets on said standards for rotation about an axis transverse to the first said axis; and means for individually retarding rotation of said brackets and for locking said brackets in various rotatably adjusted positions.

10. A rod holder of the character described, comprising: a base, three spaced apart ears secured to said base; a standard in each space between adjacent ears; means comprising a rod extending through said ears and said standards and mounting said standards on said ears for rotation about an axis; means for individually locking said standards in various rotatably adjusted positions; a rod holding bracket for each of said standards; means mounting said brackets on said standards for rotation about an axis transverse to the first said axis; and means for individually retarding rotation of said brackets and for locking said brackets in various rotatably adjusted positions.

11. A base of the character described, comprising: a stationary member and a movable member, each member having a broad first side and an opposite second side, means securing said members to each other for relative rotation from a compact position to an extended position, said first sides being in face-to-face relationship in said compact position and in coplanar relationship together defining a generally planar supporting base for firmly engaging a generally level supporting surface in said extended position; means secured to the second side of said movable member for attaching said holder to a support when said base is in the compact position; and means for locking said members in the compact position.

References Cited in the file of this patent
UNITED STATES PATENTS

| | | |
|---|---|---|
| 448,028 | Hall | Mar. 10, 1891 |
| 1,035,739 | Raes | Aug. 13, 1912 |
| 1,387,415 | Lee | Aug. 9, 1921 |
| 2,446,282 | Hart | Aug. 3, 1948 |
| 2,506,824 | Brown | May 9, 1950 |
| 2,893,673 | Maly | July 7, 1959 |
| 2,969,899 | Brooks | Jan. 31, 1961 |